United States Patent
Bixel

(10) Patent No.: US 7,456,601 B2
(45) Date of Patent: Nov. 25, 2008

(54) SYSTEM AND METHOD FOR STARTING A WOUND ROTOR MOTOR

(75) Inventor: Paul S. Bixel, Salem, VA (US)

(73) Assignee: TM GE Automation Systems LLC, Roanoke, VA (US)

( * ) Notice: Subject to any disclaimer, the term of this patent is extended or adjusted under 35 U.S.C. 154(b) by 0 days.

(21) Appl. No.: 11/868,545

(22) Filed: Oct. 8, 2007

(65) Prior Publication Data

US 2008/0024087 A1  Jan. 31, 2008

Related U.S. Application Data

(63) Continuation-in-part of application No. 11/576,576, filed as application No. PCT/US2005/027802 on Aug. 5, 2005, and a continuation-in-part of application No. 11/576,558, filed as application No. PCT/US2005/016862 on May 13, 2005.

(51) Int. Cl.
H02P 1/26 (2006.01)
H02H 5/04 (2006.01)
H02H 7/08 (2006.01)

(52) U.S. Cl. .................... 318/783; 318/466; 700/286; 307/115; 361/36

(58) Field of Classification Search .............. 318/430, 318/432, 434, 445, 466, 783, 772, 800; 700/286; 207/115; 361/36
See application file for complete search history.

(56) References Cited

U.S. PATENT DOCUMENTS

| 4,438,383 | A | * | 3/1984 | Etheridge | 318/799 |
|---|---|---|---|---|---|
| 4,712,054 | A | * | 12/1987 | Boldt | 318/758 |
| 4,806,838 | A | * | 2/1989 | Weber | 318/729 |
| 5,013,990 | A | * | 5/1991 | Weber | 318/814 |
| 6,917,124 | B2 | * | 7/2005 | Shetler et al. | 307/66 |
| 7,006,897 | B2 | * | 2/2006 | See et al. | 700/286 |
| 2003/0023884 | A1 | * | 1/2003 | See et al. | 713/300 |
| 2003/0048006 | A1 | * | 3/2003 | Shelter et al. | 307/64 |
| 2005/0035664 | A1 | * | 2/2005 | Zver et al. | 307/115 |
| 2006/0106502 | A1 | * | 5/2006 | See et al. | 700/286 |
| 2006/0273751 | A1 | * | 12/2006 | DeJonge et al. | 318/772 |

OTHER PUBLICATIONS

Morel, L., et al., Double-fed induction machine: converter optimisation and field oriented control w/o pos'n sensor; IEE- Proc-Electr. Power Appl., vol. 145, No. 4, Jul. 1998.

* cited by examiner

*Primary Examiner*—Paul Ip
(74) *Attorney, Agent, or Firm*—Woods Rogers PLC; Peter E. Rosden

(57) ABSTRACT

A system and method for starting and regulating a wound rotor motor especially during the period between inactivity and a speed determined by the voltage ratings of the drive system. In a first embodiment, a starting resistor and a starting bypass contactor are connected between the rotor of the motor and a low voltage source inverter. In an alternative embodiment, the arrangement of the first embodiment is altered by connecting a shorting contactor on one side to the junction of the voltage source inverter, the starting resistor and the starting bypass contactor so as to be short circuited on the opposite side of the shorting contactor.

7 Claims, 3 Drawing Sheets

SYSTEM AND METHOD FOR STARTING A WOUND ROTOR MOTOR

CROSS-REFERENCES TO RELATED APPLICATIONS

This application is a continuation-in-part of PCT/US2005/027802, filed on Aug. 5, 2005, which entered the U.S. national phase as U.S. Ser. No. 11/576,576 with a § 371(c) filing date of Apr. 3, 2007, and which is a continuation-in-part of PCT/US2005/016862, filed on May 13, 2005, which entered the U.S. national phase as U.S. Ser. No. 11/576,558 with a § 371(c) filing date of Apr. 3, 2007, both of which are incorporated herein by reference in their entirety.

TECHNICAL FIELD

The subject invention relates generally to a system and method for starting a wound rotor motor used in industrial applications. More particularly, the system and method provide an economical and efficient starting circuit for such a motor by arranging conventionally known components in a novel configuration.

BACKGROUND OF THE INVENTION

A wound rotor motor (WRM) can be controlled using a voltage source inverter (VSI) in combination with a voltage source converter (VSC) so that variable motor speed and torque are obtained. An advantage of a this type of system is that only a fraction of the power delivered by the motor to the shaft which it drives must be handled by the drive system, i.e. the VSI/VSC combination. This is a desirable feature since the cost of the drive system is proportional to its capacity.

However, in order to operate under VSI control a WRM must first be started and brought from inactivity to some speed so that the rotor voltage does not exceed the voltage ratings of the drive system. In the prior art, this has been achieved by reliance on expensive starting resistors and contactors. FIG. 1 illustrates such a conventional system where power is supplied from a utility at 10 through a stator isolation breaker 20 connected to the stator of a motor 30. Some power flows out of the rotor of motor 30 during starting when torque is required at the motor shaft and voltage is blocked by inverter isolation breaker 40 from reaching the motor drive elements formed by conventional VSI 50 and conventional VSC 60. Instead, this power is diverted through starting breaker 70 to resistance means 80, which can, for example, be a liquid rheostat or other similarly functioning device, and is dissipated there in the form of heat. When the speed of motor 30 has accelerated to the point that the rotor voltage no longer exceeds the ratings of the VSI 50, breaker 70 opens, inverter isolation breaker 40 closes and the motor continues operation under the control of the VSI 50. The point at which the transition from resistance means 80 to VSI 50 operation occurs defines the minimum operating speed of the system under VSI 50 control.

The use of a low voltage VSI in a rotor circuit of a WRM provides for a robust and economical way to control torque in the motor in a limited speed range. This range is a function of the synchronous speed of the motor. Thus, in a typical application, the motor would operate under inverter control from 70% to 100% of its synchronous speed. In such systems, there must be a means to control the WRM during a start cycle such that it can be brought to the speed range within which the inverter controls operation. The components comprising such starter systems can be a very significant factor in the total cost of the system and therefore play a key role in determining its marketability.

What is needed is a more efficient and economical way to bring wound rotor motors to the desired speed range for inverter control.

SUMMARY OF THE INVENTION

This invention relates to a system and method for starting and regulating an AC powered wound rotor motor. In one embodiment, the system includes a stator isolation breaker positioned on an AC bus between the mains and the stator of the motor. The inputs of at least one starting resistor and a starting bypass contactor are connected to the rotor of the motor, while their outputs are connected to the input of a low voltage source inverter. The input of a voltage source converter is connected on a bidirectional DC bus to the output of the low voltage source inverter. The output of the voltage source converter is connected through a rotor circuit breaker and rotor circuit transformer to the AC bus. In an alternative embodiment, a shorting contactor is connected at its input at the junction of the outputs of the starting bypass contactor and the starting resistor and the input of the voltage source inverter. The output of the shorting contactor is shorted. In one method of the invention, the rotor circuit breaker is closed, the voltage source converter is initialized and the starting bypass contactor is opened. After AC power is delivered to the stator of the motor, AC power output by the rotor of the motor is delivered to the starting resistor and the starting bypass contactor is closed when the voltage generated by the rotor of the motor has fallen to a predetermined point within the ratings of the voltage source inverter. In another method of the invention, the rotor circuit breaker is closed, the voltage source converter is initialized and the starting bypass contactor as well as an additional shorting contactor are opened. After AC power is delivered to the stator of the motor, AC power output by the rotor of the motor is delivered to the starting resistor and, if the motor ceases to accelerate and voltage from the rotor has not fallen to a predetermined point, the shorting contactor is closed. Otherwise, the starting bypass contactor is closed when the voltage generated by the rotor of the motor has fallen to the predetermined point.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
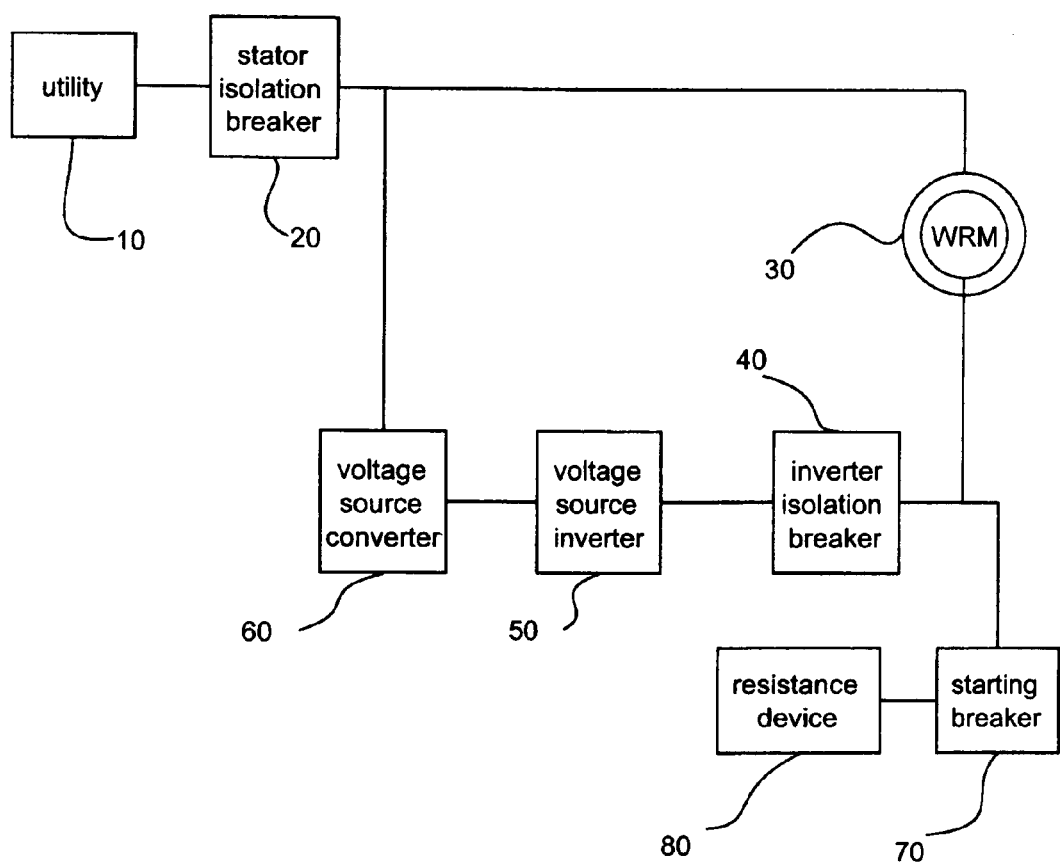
FIG. 1 is a block diagram of the components of a conventional motor starting circuit.
Figure 2:
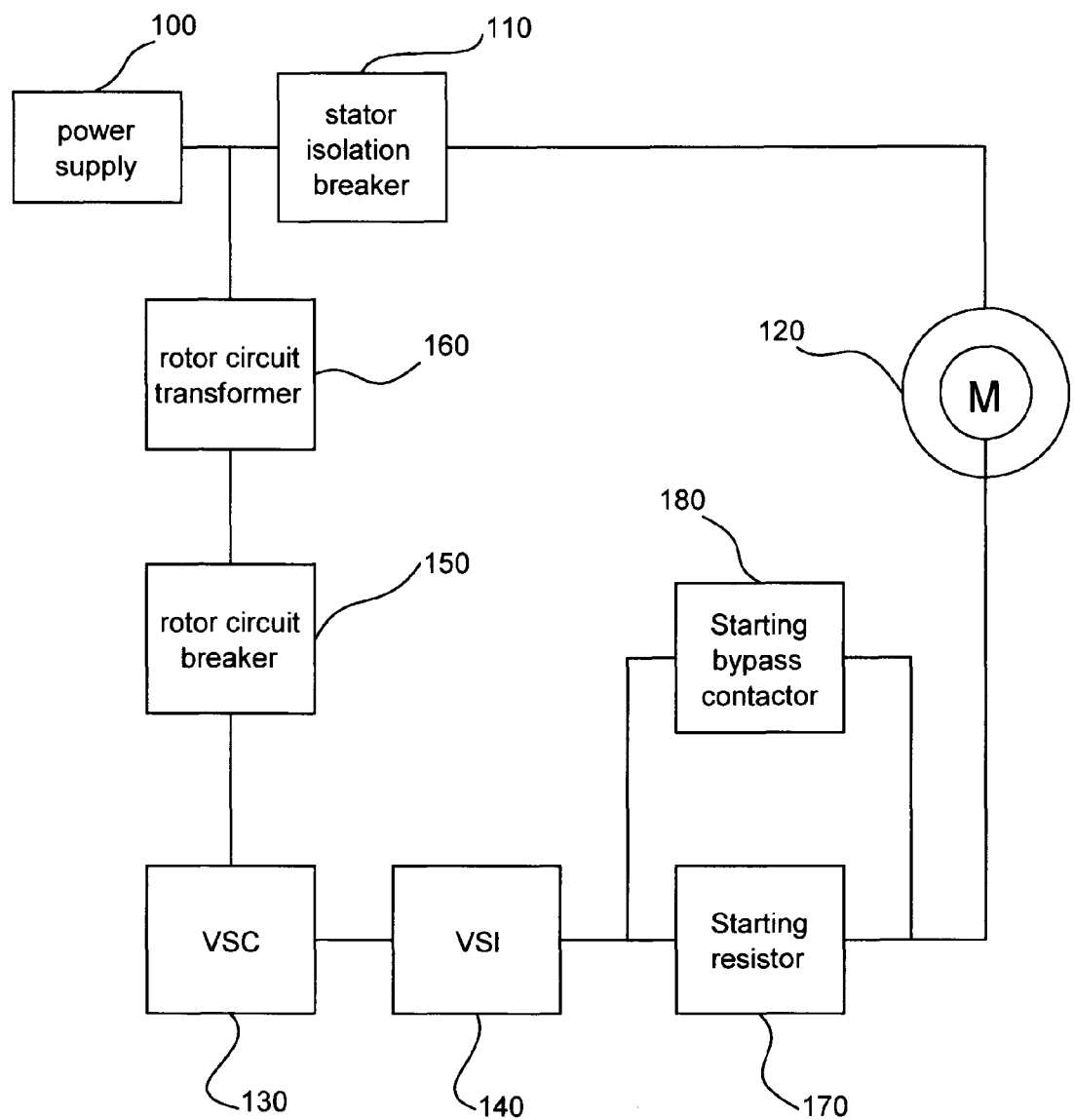
FIG. 2 is a block diagram of the components of the starting circuit of the preferred embodiment of this invention.

For a more detailed understanding of the invention, reference is first made to FIG. 2 of the drawings which presents a block diagram view of the components in the preferred embodiment of the starting circuit of this invention. As in FIG. 1, power is provided from a power supply 100, such as a utility mains, generator or any other source of AC power, through a protective stator isolation breaker 110 to a wound rotor motor 120. Typically, three phase power is provided in such a system although other arrangements are possible depending on specific system requirements. Stator isolation breaker 110 provides thermal protection of the motor circuit, allows for disconnection of the motor and drive elements for maintenance and provides protection against short circuit faults anywhere in the system.

The drive elements include VSC 130 and VSI 140. VSC 130 is an isolated gate bipolar transistor (IGBT)-based DC/AC power supply. Typically, protective means are provided both to protect VSC 130 from faults and to lower voltage from the AC bus down to the lower voltage rating of VSC 130. Thus, in FIG. 2, VSC 130 is connected over an AC bus through rotor circuit breaker 150 which is a basic protective device for VSC 130. If there is a fault in VSC 130, breaker 150 will open. In addition, rotor circuit transformer 160 is connected between breaker 150 and the AC bus. VSC 130 and VSI 140 are typically low voltage components. Thus, transformer 160 is needed to transform the stator voltage, which may be as high as 4kV, down to a low voltage level such as 460V. Transformer 160, thus, further controls the voltage of the bidirectional DC bus connecting VSC 130 to VSI 140. It should be noted that the protective means for VSC 130 can take other forms than those disclosed. For example, fuses could be used instead of a breaker and an autotransformer could be used instead of a transformer. VSC 130 can cause power to flow in either direction to maintain the bidirectional DC bus voltage at a required setting and has ratings based on its design which may not be exceeded. The term "ratings" refers, for the purpose of this invention, to the maximum power, current and voltage handling capability of a particular component. The cost of VSC 130 is directly proportional to its ratings, so keeping the rated power as low as possible is a desirable objective. In certain designs where a particularly large power rating is required, VSC 130 may be comprised of several voltage source controllers connected in parallel in order to achieve the desired power rating. VSI 140 is also an IGBT-based power supply. It is similar in design to VSC 130 and also has ratings based on its design, but it controls motor torque rather than a DC voltage bus. VSC 130 and VSI 140 are conventional elements similar to VSC 60 and VSI 50. VSI 140 is coupled to an AC bus connected through at least one starting resistor 170 and starting bypass contactor 180 to motor 120. Starting resistor 170 may be a single resistor or multiple resistors connected in parallel or in series. Contactor 180 must be rated with a voltage equivalent to the open circuit voltage of the motor and must have a current rating at least equivalent to the current rating of the motor rotor circuit. For example, if motor 120 had a rotor circuit rated for 200 amps and a stator circuit rated for 100 amperes, then contactor 180 must be rated for at least 200 amperes. Resistor 170 must be selected so as to carry the rotor current for the duration of the start. The Ohmic value of resistor 170 should be selected such that the maximum inverter current of VSI 140 is not exceeded at the moment starting commences. This is the same moment that the rotor voltage is at its maximum. The selection of the resistance would then be governed approximately by the equation:

$$R = (V_{rotor} - V_{inverter})/I_{inverter}$$

In this equation, $V_{rotor}$ is the rotor open circuit voltage while $V_{inverter}$ is the rated voltage of the inverter and $I_{inverter}$ is the maximum current of the inverter. In the preferred embodiment, only one fully rated contactor is required in the rotor circuit.

Figure 3:
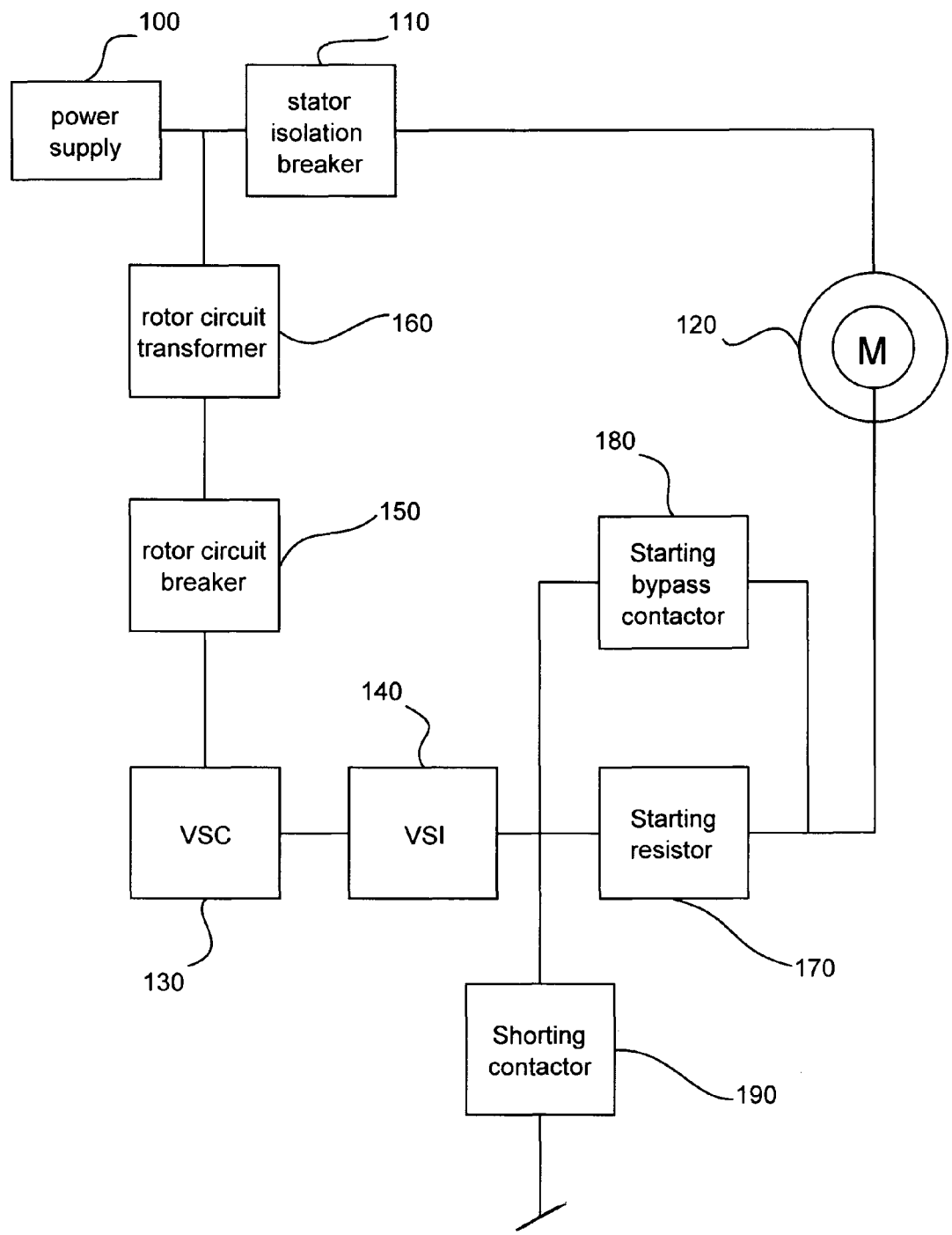
FIG. 3 is a block diagram of the components of the starting circuit of an alternative embodiment of this invention.

An alternative embodiment of the circuit is presented in FIG. 3. In this embodiment, shorting contactor 190 is added to the circuit between VSI 140 and resistor 170, running from a junction of VSI 140, resistor 170 and contactor 180 to short circuit (all phases connected together) on the opposite side of shorting contactor 190. Engaging shorting contactor 190 allows additional acceleration torque to develop for motor 120 before VSI 140 begins operation. The voltage rating of shorting contactor 190 is equivalent to the rated voltage of VSI 140, while its current rating is much less than that of contactor 180 since it is used only for a brief period while starting motor 120 and until motor 120 reaches the desired speed range during its start cycle, as explained above. The duration of this period is a function of system inertia, load and the Ohmic value of resistor 170. For example, it is not uncommon for a start cycle to take less than 60 seconds and to use a shorting contactor 190 with an overload rating of 400% during that start cycle. So if the maximum circuit current were 400 Amps, such a contactor 190 with a continuous rating of only 100 Amps could be selected. This lower current contactor would be less expensive than a contactor rated for 400 Amps. Also, the voltage rating of shorting contactor 190 is low compared to bypass contactor 180. Thus, if motor 120 has a 2 kV rotor winding and is operated with VSI 140 having a 690V rating, then contactor 180 must be rated for 2 kV, but contactor 190 need only be rated for 690V. Thus, contactor 190 is much less expensive than contactor 180 thereby keeping the overall cost of the starting circuit relatively low.

The method of operation of this starting circuit requires first that rotor circuit breaker 160 be closed and VSC 130 be initialized and brought into operation. Bypass contactor 180 and shorting contactor 190 are opened or left in an open position. Stator breaker 110 is then closed and motor 120 begins to accelerate as rotor voltage begins to decrease. During this time, current flows from the rotor circuit of motor 120 through starting resistor 170 and is rectified by the idle VSI 140 onto the DC bus. In this mode, VSI 140 is functioning only as a rectifier by nature of free-wheeling diodes included in the IGBT switches used in its construction. Power thus transferred to the DC bus is converted by operating VSC 130 and placed back onto the utility mains. When rotor voltage has fallen to a predetermined point which is within the specifications of VSI 140, bypass contactor 180 is closed, VSI 140 begins operation and variable speed control of motor 120 is initiated. As motor 120 accelerates during the starting cycle the rotor voltage decreases and the current flowing through starting resistor 170 also decreases. It may occur that not enough torque is generated to further accelerate the motor and the voltage did not fall to within the ratings of the VSI 140. In this case, it is possible to begin operation of VSI 140 to increase the current and further accelerate the motor. In the event that motor 120 ceases to accelerate but voltage from the rotor has not yet fallen to a predetermined point within the ratings of the voltage source inverter, VSI 140 could be operated to draw additional current through starting resistor 170 until voltage from the rotor of the motor does fall to a predetermined point within the ratings of VSI 140 at which time starting bypass contactor 180 is closed. Another alternative in the case of insufficient torque is shown in the embodiment of FIG. 3. After motor 120 ceases to accelerate, shorting contactor 190 is closed to lower the impedance of the rotor circuit and provide additional torque. When rotor voltage has fallen to within the specifications of VSI 140, bypass contactor 180 is closed and shorting contactor 190 is opened approximately simultaneously. Then, as in the preferred embodiment, VSI 140 begins operation and variable speed control of motor 120 begins. The starting circuit of this invention may be applied with particularly beneficial results using the TM-10SPR low voltage inverter.

The foregoing invention has been described in terms of the preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A system for starting and regulating a wound rotor motor having a stator connected by an AC bus through a stator isolation breaker to an AC power source and a rotor from a period of inactivity until voltage generated by the rotor of the motor falls to a predetermined point, comprising:
   a low voltage source inverter having one input and one output;
   at least one starting resistor having an input and an output, the input of which is connected to the rotor of the motor and the output of which is connected to the input of said low voltage source inverter;
   a starting bypass contactor having an input and an output, the input of which is connected to the rotor of the motor and the output of which is connected to the input of said low voltage source inverter;
   a voltage source converter having one input and one output, the input of which is connected by a bidirectional DC bus to the output of said low voltage source inverter; and
   protective means for protecting said voltage source converter from faults and for lowering voltage from the AC bus wherein said protective means has an input connected to the output of said voltage source converter and an output connected to the AC bus.

2. The system of claim 1 wherein said protective means further comprises
   a rotor circuit breaker having one input and one output, the input of which is connected to the output of said voltage source converter; and
   a rotor circuit transformer having one input and one output, the input of which is connected to the output of said rotor circuit breaker and the output of which is connected to the AC bus.

3. The system of claim 1 further including a shorting contactor having an input and an output, the input of which is connected to the junction of the input of said voltage source inverter and the outputs of both said starting bypass contactor and said starting resistor wherein the output of said shorting contactor is shorted.

4. The system of claim 1 wherein said starting resistor is further comprised of multiple resistors arranged in series or in parallel.

5. A method for starting and regulating a wound rotor motor with an AC power source using an open stator isolation breaker connected between the stator of the motor and the AC power source, a rotor circuit breaker connected at its input to the output of a voltage source converter and at its output to the input of a rotor circuit transformer which is connected at its output to the AC bus, and a low voltage source inverter having known ratings connected at its output to the voltage source converter and at its input to the outputs of at least one starting resistor and a starting bypass contactor which are connected at their inputs to the rotor of the motor, comprising:
   closing the rotor circuit breaker;
   initializing the voltage source converter;
   opening the starting bypass contactor;
   supplying AC power to the stator of the motor by closing the stator isolation breaker;
   delivering AC power generated by the rotor of the motor to the starting resistor; and
   closing the starting bypass contactor when the voltage generated by the rotor of the motor has fallen to a predetermined point within the ratings of the voltage source inverter.

6. A method for starting and regulating a wound rotor motor with an AC power source using an open stator isolation breaker connected between the stator of the motor and the AC power source, a rotor circuit breaker connected at its input to the output of a voltage source converter and at its output to the input of a rotor circuit transformer which is connected at its output to the AC bus, and a low voltage source inverter having known ratings connected at its output to the voltage source converter and at its input to the outputs of at least one starting resistor, a starting bypass contactor and the input of a shorting contactor wherein the inputs of the starting resistor and the starting bypass contactor are connected to the rotor of the motor and the output of the shorting contactor is shorted, comprising:
   closing the rotor circuit breaker;
   initializing the voltage source converter;
   opening the starting bypass contactor and the shorting contactor;
   supplying AC power to the stator of the motor by closing the stator isolation breaker;
   delivering AC power generated by the rotor of the motor to the starting resistor;
   if the motor ceases to accelerate and voltage from the rotor has not fallen to a predetermined point within the ratings of the voltage source inverter, closing the shorting contactor; and
   otherwise, closing the starting bypass contactor when the voltage generated by the rotor of the motor has fallen to the predetermined point.

7. A method for starting and regulating a wound rotor motor with an AC power source using an open stator isolation breaker connected between the stator of the motor and the AC power source, a rotor circuit breaker connected at its input to the output of a voltage source converter and at its output to the input of a rotor circuit transformer which is connected at its output to the AC bus, and a low voltage source inverter having known ratings connected at its output to the voltage source converter and at its input to the outputs of at least one starting resistor and a starting bypass contactor wherein the inputs of the starting resistor and the starting bypass contactor which are connected at their inputs to the rotor of the motor, comprising:
   closing the rotor circuit breaker;
   initializing the voltage source converter;
   opening the starting bypass contactor;
   supplying AC power to the stator of the motor by closing the stator isolation breaker;
   delivering AC power generated by the rotor of the motor to the starting resistor;
   if the motor ceases to accelerate and voltage from the rotor has not fallen to a predetermined point within the ratings of the voltage source inverter, operating said voltage source inverter to draw additional current through the at least one starting resistor; and
   otherwise, closing the starting bypass contactor when the voltage generated by the rotor of the motor has fallen to the predetermined point.

* * * * *